INVENTOR.
JAMES L. CHENGGES
BY
J. T. Comfort

Sept. 26, 1967          J. L. CHENGGES          3,343,500

SWITCH FOR A TOW LINE CONVEYOR SYSTEM

Filed June 29, 1965          2 Sheets-Sheet 2

INVENTOR.
JAMES L. CHENGGES
BY
*J. T. Comfort*

United States Patent Office 3,343,500
Patented Sept. 26, 1967

3,343,500
SWITCH FOR A TOW LINE CONVEYOR SYSTEM
James L. Chengges, Roanoke, Va., assignor to General Electric Company, a corporation of New York
Filed June 29, 1965, Ser. No. 468,086
5 Claims. (Cl. 104—172)

ABSTRACT OF THE DISCLOSURE

A mechanical switch arrangement for diverting a vehicle propelled by a tow-pin engaging a continuously moving chain or cable under the floor supporting the vehicle via a slotted opening consisting of a diverter blade interposed in the path of the tow-pin for switching the vehicle from a main line to a spur. The diverter blade is attached to a frame, which pivots on an axis parallel to the main line, so that the blade describes a vertical arc perpendicular to the main line during operation of the switch.

This invention pertains to a tow line conveyor system, and more particularly, to a switch utilized in such systems where vehicles are towed by continuously moving chains or cables carried in predetermined channels beneath the floor surface upon which the vehicles are moved, the vehicles making contact with the towing chains via pins projecting through continuous slots in the floor surface.

Normally tow carts or trucks in tow line conveyor apparatus are transported upon a floor surface having a moving chain or cable below such surface, access to the chain or cable being made by a pin carried by the cart through an open slot in the surface with the slot being continuous for the entire length or circuit of the route to be served by the carts. Numerous spurs or offshoots of the slotted path are provided to enable the carts to be switched to unloading positions. Switching of a cart from the main route onto a spur is accomplished by a mechanical interposer or switch, which causes the cart's pin to be diverted into the slot of the spur concerned, thereby disengaging the pin from the driving chain or cable and causing the cart to follow the path of the spur to an extent depending upon the momentum of the cart.

The mechanical switch normally used is a spring loaded blade pivoted on a shaft that is at a right angle to the floor. It is not unusual for such a mechanical switch to vibrate open to divert the wrong cart. The diverter blade may also bind so that it is neither reliable nor accurate. The mechanical switch is thus often the most troublesome portion of the tow line conveyor system.

The present invention is directed to correcting the problem of the mechanical switch failures by providing a unique mechanical switch. It is an object of this invention, therefore, to provide a new and improved mechanical switch for use in a tow line conveyor system of the type described.

Another object of this invention is to provide a new and improved mechanical switch for reliably diverting carts from the main route onto a spur.

The invention is set forth with particularity in the appended claims. The principles and characteristics of the invention, as well as other objects and advantages are revealed and discussed through the medium of the illustrative embodiments appearing in the specification and drawings which follow.

Figure 1:
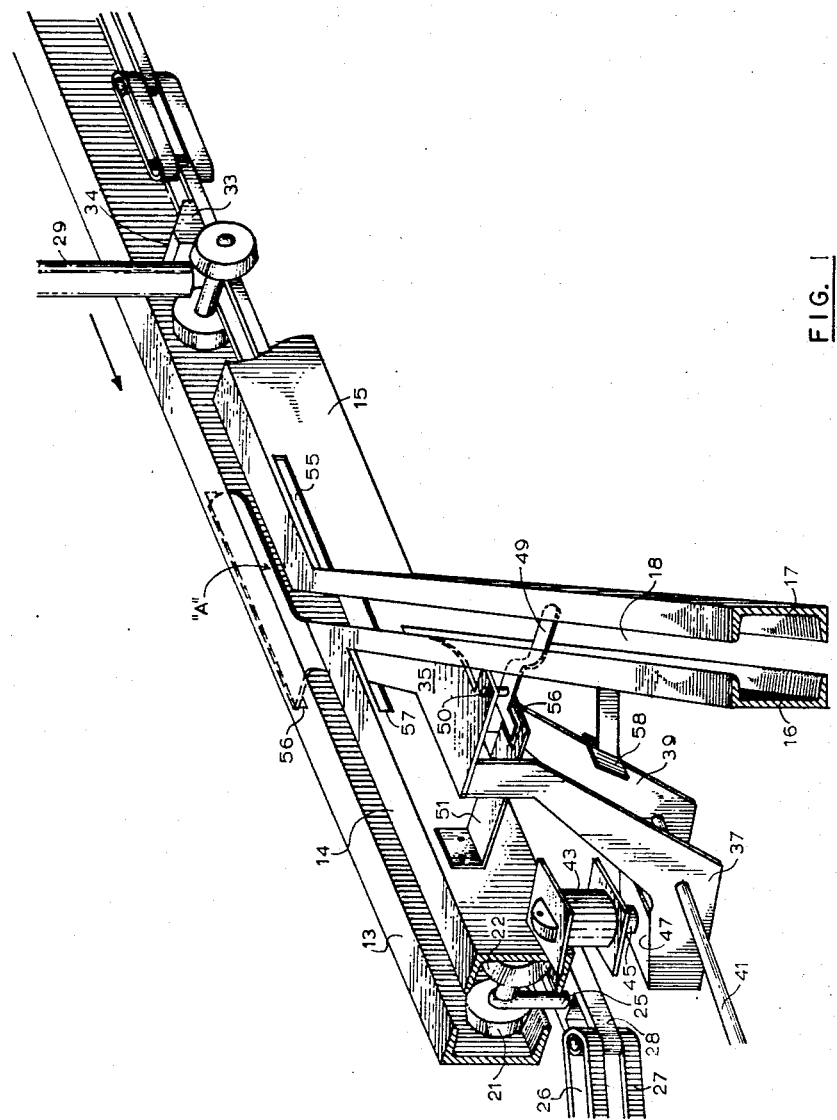
FIGURE 1 shows the floor conveyor switch in the closed or diverting position so that the diverting blade blocks the main tow channel.
Figure 2:
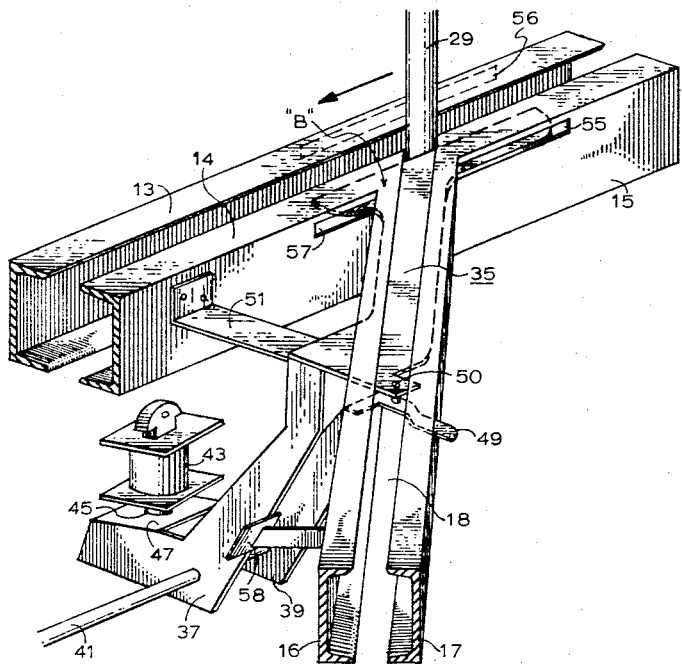
FIGURE 2 shows the floor conveyor switch in the open position so that the diverting blade blocks the spur channel.
Figure 3:
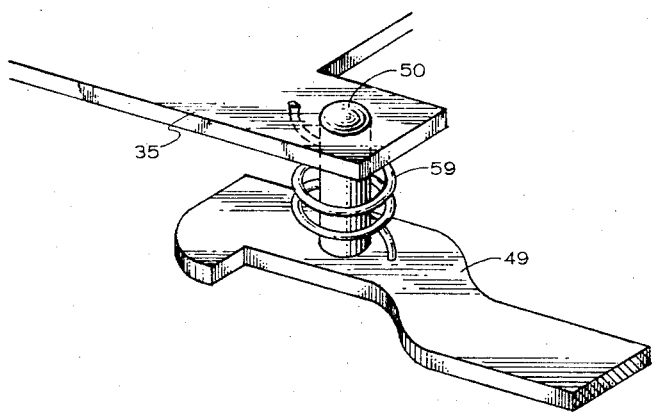
FIGURE 3 shows a view of the spring loaded latch.

The elements in both FIGURES 1 and 2 are the same, in different positions so that the same reference numerals are used in both figures.

Flanges 13 and 15 are assembled in a standard manner to form the main tow channel 14. Flanges 16 and 17 are assembled to form a spur channel 18 and connected to the main channel 14 to form a Y shaped configuration. The flanges 13 and 15, and 16 and 17 form a track for the wheels of the trolleys 25 and 33. The trolleys 25 and 33 are connected throughout the length of the tow chain by alternately connecting a series of chain links 26–28 to the trolleys. Both idler and pusher trolleys are connected in the tow chain. Idler trolleys such as idler trolley 25 support and guide the two chain through the curves of the tow channel 14. Pusher trolleys such as trolley 33 in addition engage the two pins such as tow pin 29 by a lip 34 to pull the tow cart along with the movement of the tow chain.

A diverting blade 35 is supported by two supports 37 and 39 connected by a push plate 47. The two supports 37 and 39 are pivotally mounted on shaft 41 so that the diverting blade assembly 35, 37, 39 and 47 may pivot in a counterclockwise direction about the pivot axis of shaft 41. An open position blade stop 58 is secured to flange 16 to stop the movement of the supports 37 and 39 as they pivot in a counterclockwise direction.

The diverting blade 35 is freely movable through slots 55–57 in flanges 13, 15, 16 and 17.

Latch support 51 secured to flange 15 has a notch 56 in one end adapted to engage the tip of latch lever 49 pivotally secured to diverting blade 35 by pin 50. Solenoid 43 with solenoid core 45 is secured in a permanent position by a support not shown so that when the solenoid coil is de-energized the solenoid core 45 is retracted as shown in FIGURE 2; and when the solenoid coil 43 is energized the solenoid core 45 is extended as shown in FIGURE 1, pushing the push plate 47 down, moving the support plates 37 and 39 in a counterclockwise direction about the pivot axis of the pivot shaft 41, moving the diverting blade into the slots 55–57 as shown in FIGURE 1.

The latch lever 49 is spring biased with spring 57 in a counterclockwise direction. With the diverting blade 35 in the position shown in FIGURE 1, one end of the latch lever 49 extends into the channel 18.

Tow pin 29 is attached to the tow cart so that the tow cart may be moved by moving tow pin 29. Tow pin 29 is engaged by the lip 34 of the pusher trolley 33 moving the tow pin 29 towards the intersection of main channel 14 and the spur channel 18. The solenoid coil 43 is normally de-energized as shown in FIGURE 2 so that solenoid core 45 is retracted and support members 37 and 39 are urged in a clockwise direction by the weight of the support members 37 and 39 and diverter blade 35. A spring may also be connected between the solenoid coil 43 and the push plate 47 to aid in this counterclockwise movement when the solenoid coil 43 is de-energized. The diverter blade 35 is moved away from the main channel 14 by the clockwise movement of the supports 37 and 39 to the position indicated in FIGURE 2 so that the B side of the diverter blade blocks the spur channel 18 and the tow pin 29 continues its movement in the main channel 14.

The solenoid coil 43 is energized to divert tow pin 29 from the main channel 14 to the spur channel 18. Solenoid core 45 is extended to push bar 47, rotating the support members 37 and 39 in a counterclockwise direction until the supports 37 and 39 are stopped by blade stop 57. Latch 49 moves with the supports 37 and 39 until the tip of the latch 49 engages the notch 56 in the latch support 51. The other end of the latch 49 extends into the spur channel 18. The diverter blade is moved out into the main channel and through the slot 56 until the curved edge A of the diverter blade 35 is positioned in the main channel 14. The tow pin 29 meets the curved portion A of the diverter blade 35 and is diverted from the main channel 14 into the spur channel 18.

The solenoid coil 43 has been de-energized as soon as the latch 49 has latched the diverter plate assembly up in the diversion position in the manner described herein. The latch 49 in the notch 56 restrains the diverter blade assembly from rotating in a clockwise direction.

The tow pin 29 continues in the spur channel 18 meeting spring loaded latch 49, pivoting spring loaded latch 49 in a clockwise direction to remove the tip of the latch 49 from notch 56. Diverter blade assembly 47, 49, and 35 then rotates in a clockwise direction to remove the diverter blade 35 from the main channel 14 to allow passage of the following tow pin.

The diverter blade 35 is moved into position in the main channel 14 and out of position from the main channel by the pivoting movement of the supports 37 and 39 about pivot shaft 41. In summary a new and improved floor conveyor switch for an under-the-floor conveyor has been described. The diverter blade is pivoted on a pivot axis in a plane separated, but parallel to the plane that the diverter blade itself moves in. Such a floor conveyor switch is more reliable and accurate than the previous floor conveyor switches.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. In a tow line conveyor system where vehicles towed by an under-the-floor continuously moving tow means such as chains or cables are switched from the main route to a spur by diversion of the pin of the vehicle contacting the tow means to a spur, the improvement comprising a mechanical switch having a diverter blade adapted to be interposed across the continuous tow means, pivot means connected to said diverter blade and pivoted on an axis parallel to said continuous tow means so that said diverter blade operates in a vertical arc perpendicular to the continuous tow means, and means for pivoting said pivot means to interpose said diverter blade across the continuous tow means to divert the pin of the vehicle to the spur.

2. In a tow line conveyor system where vehicles towed by an under-the-floor continuously moving tow means such as chains or cables are switched from the main route to a spur by diversion of the pin of the vehicle contacting the tow means to a spur, the improvement comprising a mechanical switch having a diverter blade adapted to be interposed across the continuous tow means, pivot means connected to said diverter blade and pivoted on an axis parallel to said continuous tow means so that said diverter blade operates in a vertical arc perpendicular to the continuous tow means, and a solenoid adapted to pivot said pivot means to interpose said diverter blade across the continuous tow means to divert the pin of the vehicle to the spur.

3. In a tow line conveyor system where vehicles towed by an under-the-floor continuously moving tow means such as chains or cables are switched from the main route to a spur by diversion of the pin of the vehicle contacting the tow means to a spur, the improvement comprising a mechanical switch having a diverter blade adapted to be interposed across the continuous tow means, pivot means connected to said diverter blade and pivoted on an axis parallel to said continuous tow means so that said diverter blade operates in a vertical arc perpendicular to the continuous tow means, means for pivoting said pivot means to interpose said diverter blade across the continuous tow means to divert the pin of the vehicle to the spur, and means to latch said diverter blade across the continuous tow means.

4. In a tow line conveyor system where vehicles towed by an under-the-floor continuously moving tow means such as chains or cables are switched from the main route to a spur by diversion of the pin of the vehicle contacting the tow means to a spur, the improvement comprising a mechanical switch having a diverter blade adapted to be interposed across the continuous tow means, pivot means connected to said diverter blade and pivoted on an axis parallel to said continuous tow means so that said diverter blade operates in a vertical arc perpendicular to the continuous tow means, means for pivoting said pivot means to interpose said diverter blade across the continuous tow means to divert the pin of the vehicle to the spur, means to latch said diverter blade across the continuous tow means, and means responsive to the diversion of the pin of the vehicle to the spur for withdrawing said diverter blade from the continuous tow means.

5. In a tow line conveyor system where vehicles are towed by an under-the-floor continuously moving tow means such as a chain are switched from the main route to a spur by diversion of the pin of the vehicle contacting the tow means to a spur, the improvement comprising a mechanical switch having a diverter blade adapted to be interposed across the continuous tow means, said diverter blade having an inclined edge facing the direction of travel of the continuous tow means, support plates for supporting said diverter blade, pivot means connected to said support plates and pivoted on an axis parallel to said continuous tow means so that said diverter blade operates in a vertical arc perpendicular to the continuous tow means, means for pivoting said pivot means to interpose said diverter blade across the continuous tow means to divert the pin of the vehicle to the spur, means to latch said diverter blade across the continuous tow means, and means responsive to the diversion of the pin of the vehicle to the spur for withdrawing said diverter blade from the continuous tow means.

References Cited

UNITED STATES PATENTS

| | | | |
|---|---|---|---|
| 2,990,936 | 7/1961 | Pearson | 104—88 |
| 3,045,610 | 6/1962 | Klamp | 104—88 |
| 3,081,710 | 3/1963 | Dehne | 104—96 |
| 3,127,849 | 4/1964 | Klamp | 104—88 |

ARTHUR L. LA POINT, *Primary Examiner.*

D. F. WORTH, *Assistant Examiner.*